3,230,289
SILICONE TREATMENT FOR PAPER
Heinz Eder and Hans Franz, Munich, Germany, assignors to Wacker-Chemie G.m.b.H., Munich, Germany
No Drawing. Filed June 8, 1962, Ser. No. 200,960
Claims priority, application Germany, June 28, 1961, W 30,267
6 Claims. (Cl. 264—216)

This invention relates to a method for treating paper with silicones to impart release characteristics and retain sealability.

It is well known to treat base members, particularly plane-surfaces such as papers, paper-board, aluminum and other metal foils, plywood, glassine, regenerated cellulose and a host of other materials with a wide variety of siloxane polymers, particularly siloxane fluids and resins. The purpose of such treatment is to render the base member water-repellent, abhesive (i.e. non-adhesive or easily released from adhesive or sticky materials), or otherwise to alter the physical and chemical characteristics of the base member. The treatment of base members with siloxane polymers may be simply a coating on one surface of the base member or both surfaces may be coated and if a porous or fibrous base member is involved, the siloxane may be employed as an impregnant. The papers, foils, films, fibers and other base members treated with the siloxane polymers have been used as protective and separating sheets to cover self-adhesive foils and labels, for packaging sticky materials, as sheets and forms in the preparation of sticky materials such as in the baking of sweet rolls and the preparation of candies and as textiles.

Despite the widespread commercial development of siloxane polymers and their use on paper and other base members, it has been found to be difficult to seal packages made from paper treated with siloxane polymers. The treated paper does not stick to itself and does not adhere to adhesives normally used for sealing packages. Some of the solutions offered for this problem include leaving a margin of untreated paper for later application of sealing adhesives and the use of special dextrin-based adhesives with strong cross-linking additives to permit adhesion of siloxane treated paper to itself. The proposed solutions have all proved to have commercial disadvantages in that they are not universally applicable, they require additional handling and processing steps, thus increasing the manufacturing costs for the treated base material, and the solutions suggested do not fit into automated mass production techniques.

It is the object of this invention to introduce a composition of matter and a method for treating base materials, particularly paper, to render them non-adhesive, to impart release characteristics thereto, and to improve water-repellent properties, grease-resistance and wet strength of the papers while permitting subsequent adhesion of the paper to itself for purposes of sealing packages made from the paper or adhering the paper to a surface as required in labeling cans, bottles and other containers. The preparation of paper rendered abhesive with siloxane polymers but retaining the potential to be sealed or adhered through the use of commercial adhesives or by heat sealing is also an object. Other objects and advantages of this invention are detailed in or will be apparent from the disclosure and claims following.

The method of this invention contemplates (1) the application to paper or other plane-surface base member of a release agent based on siloxane polymers and prior to, concurrent with or subsequent to such application, (2) the application to the base member of an essentially water insoluble, organic, high polymeric film former. Thus, the paper or other base member has two chemical entities applied thereto, one being based on siloxane polymers and the other on certain organic polymers.

The organic polymeric film formers employed herein are essentially insoluble in water. Included in the operable polymeric film formers are water-insoluble cellulose derivatives such as cellulose esters (e.g. nitro cellulose, cellulose acetate and cellulose ethers); thermoplastic synthetic polymers and resins such as polyvinyl resins and polyacrylic resins (e.g. polyvinylacetates, polyvinylchlorides and polyvinylacetals), polyacrylic acid esters, polymethylacrylic acid esters and copolymerizates. Further examples of the operative organic film formers include methyl-, ethyl-, n-propyl-, n-butyl-, and hexadienyl-esters of polyacrylic acid; methyl-, ethyl-, butyl-, amyl-, phenyl- and methallyl- esters of polymethacryl acid; polyvinylbutyral, linseed oil varnish, maleic acid dibutyl ester, cellulose propionate, cellulose acetate propionate, cellulose acetate butyrate, and acetyl cellulose. Other water insoluble organic film formers which are heat sealable and/or adhesive under the action of solvents or plasticizers can be employed.

The siloxane polymers employed can be resins, fluids or rubbers and are remarkably compatible with the organic film formers employed. The siloxane polymers are organic substituted and have the unit formula

wherein each R is a monovalent hydrocarbon radical of not more than 12 carbon atoms and $n$ has an average value from 0.8 to 2.1. Thus, the operative siloxane polymers can be resinous ($n=0.8$ to $1.9$), or fluid ($n=1.9$ to $2.1$). The fluid polymers form the basis for elastomers which can be prepared from such polymers by chemical means (e.g. use of vulcanizing agents).

The siloxane polymers employed herein can be homopolymers, copolymers or mixtures and can be low polymers (i.e. thin fluids) or high polymers (i.e. gums, viscous fluids and gels soluble in organic solvents. The units present can be unsubstituted ($SiO_{4/2}$), monosubstituted ($RSiO_{3/2}$), disubstituted ($R_2SiO$) or trisubstituted ($R_3SiO_{1/2}$). The radicals represented by R can be alkyl radicals (methyl, ethyl, propyl, octyl); aryl (phenyl, diphenyl, anthracyl); alkenyl (tolyl, xylyl, ethylphenyl); aralkyl (benzyl, phenylethyl); cycloaliphatic (cyclopropyl, cyclobutyl, cyclopentyl, cyclopentenyl, cyclohexenyl) and alkenyl (vinyl, allyl, hexenyl). The substituents represented by R are monovalent hydrocarbon radicals of 1 to 12 carbon atoms.

The siloxane polymers can be admixed with curing or vulcanizing agents.

The combinations employed according to the present discovery can with the help of ordinary apparatus, be applied from solutions in organic solvents as well as from aqueous dispersions or emulsions. The compatibility of the products make their common application in one single work step possible; if necessary, however, it is also possible to work by stages in which the silicone product is applied in the final step, i.e. the uppermost layer.

A considerable step forward in the new method is that the mixture which can be used can be incorporated in a wide range of viscosities and therefore can also be applied with lacquering or brushing machines. Furthermore, vapor-proof and aromatic-proof preparations can be manufactured.

When using solutions containing, for example, silicone rubber and organic film formers in addition to hardeners, papers, parchment and pergamyn papers or plastic and metal foils can be treated or self-carrying foils can be prepared from such solutions. Since a compatibility of great range exists between silicone products and organic film formers, mixtures for a great variety of applications can be prepared from the multitudinous compositions. By observing and exploiting the compatibility limits between silicone product and organic film former, special effects in protective papers and separating foils can be attained.

As already stated, the application of the primer and the silicone film can be undertaken separately or combined in a single work step. In the latter case the silicone film necessary for water and adhesive repellency is formed when the organosilicon components bleed out on the surface while the paper is dried and condense there under the influence of the accelerators. In the two-stage process, the carrier is first covered with the organic film formers in the form of solutions or dispersions. The amount of the application should be at least 3 g./m.$^2$. A film of an organosilicon compound is applied over this primer which is used commercially for water and adhesive repellent impregnation of papers and foils. For accelerated condensation of the silicone film, the commercial world avails itself of cross-linkers and catalysts. The silicone film may likewise be created from a solution or an emulsion. The silicone application should generally not exceed 1 g./m.$^2$, but a heavier application is also possible.

The papers and foils of the present discovery are very repellent toward adhesives and sticky substances of all kinds and, in addition, have a very hydrophobic character. Surprisingly, despite the "abhesive" effect of the silicone film, they may be heat sealed. Also, by brushing these papers with organic fluids which dissolve or swell the primer and the softeners, adherences may also be attained.

The following examples are included to aid those skilled in the art in practicing the invention. The scope of the invention is delineated in the claims and is not limited by the examples. All temperatures are in degrees centigrade. All viscosities are measured at 25° C. and all proportions and percentages are based on weight unless otherwise stated.

*Example 1*

A mixture of two different viscous polyvinylacetates, namely of 14 parts by wt. of (A) a low to average viscosity polyvinylacetate with a K-value of 33 and 6 parts by wt. of (B) a high viscosity polyvinylacetate with a K-value of 70 was dissolved in 75 parts by wt. of ethyl acetate. To this solution was added another solution, consisting of 0.8 part by weight of dimethylpolysiloxane oil, 30,000 cs. with OH groups at the chain end, 0.4 part by weight of a 50% toluene solution of (C) a methylpolysiloxane resin (methyl/silicon ratio=1.2/1) in 3.8 parts by weight toluene and the whole was catalyzed by adding 0.05 part by weight of a mixture of one part by weight of dibutyltin dilaurate and 3 parts by weight of ethylorthosilicate.

The catalyzed solution which could be kept for about 8 hours was applied to one side of a sodium kraft paper so that the paper absorbed about 15 g./m.$^2$ dry material. After evaporating the solvents, a very adhesive-repellent paper was obtained which could be durably adhered by heat sealing at 130° C. or by dissolving the primer with a suitable solvent as, for instance, ethylacetate. Solutions of primer materials were even suitable for the adhesion.

*Example 2*

A polyvinylacetate mixture according to Example 1, consisting of 10 parts by weight of (A) and 5 parts by wt. of (B) was dissolved in 84.22 parts of trichloroethylene and the solution was mixed with 0.6 part by weight of dimethylpolysiloxane oil with a viscosity of 30,000 cstks. and OH-end blocks, 0.15 part by weight of methylhydrogenpolysiloxane with a viscosity of 30 cs. and 0.03 part by weight of dibutyltin dilaurate. A machine-smooth piece of sodium kraft paper is treated with this mixture on the smooth side. After evaporating the solvent a very adhesive-repellent paper was obtained, which could be heat sealed or glued when necessary.

*Example 3*

20 parts by weight of a copolymerizate of 85 parts by weight of vinyl chloride and 15 parts by wt. of vinyl acetate were dissolved in 50 parts by wt. of ethyl acetate, 15 parts by wt. of methylethyl ketone and 10 parts by wt. of toluene and mixed with 5 parts by wt. of a solution consisting of 0.8 part by wt. of a dimethylpolysiloxane gum of about 1,000,000 cs. and having OH groups on the chain end, 0.2 part by wt. of (C) the 50% methylpolysiloxane resin solution and 0.1 part by wt. of a silicic acid ester of monomethyl glycolether of the formula

in 3.9 parts by wt. toluene. Shortly before use the mixture was catalyzed with 0.03 part by wt. dibutylin dilaurate. The mixture was applied to pergamyn paper. The paper was dried and exposed to a brief heat impulse (30 sec. at 130° C.). The paper was very adhesive-repellent and can be welded at 150° C.

*Example 4*

An equally useful mixture consisting of 15 parts by wt. of a low viscosity polyvinylbutyral with a high degree of acetalization and a small content of free hydroxyl groups obtained from polyvinylalcohol and butyraldehyde, 28 parts by wt. isopropylalcohol, 56.2 parts by wt. of ethyl acetate, 0.75 part by wt. of dimethylpolysiloxane oil, 30,000 cst. and OH end blocks, and 0.05 part by wt. of a catalyst mixture consisting of 3 parts by wt. of ethylorthosilicate and 1 part by wt. of dibutylin dilaurate. Sodium kraft paper treated with this mixture could be heat sealed or coated at the places to be joined with a mixture of 1 part by wt. of methanol and 2 part by wt. of ethyl acetate and then sealed.

*Example 5*

A mixture was prepared consisting of 40 parts by wt. of a 25% solution of a soft, high viscosity polyacrylic acid ester resin in ethylacetate, 59.4 parts by wt. ethylacetate, 0.4 part by wt. of dimethylpolysiloxane oil with a viscosity of 7,000 cs. and OH end blocks, 0.2 part by wt. of (C) the 50% methylpolysiloxane resin solution in toluene and 0.02 part by wt. of dibutyltin dilaurate. This mixture was applied to aluminum foil and the foil was dried and briefly heated. The aluminum foil became very adhesive-repellent but could be glued or heat sealed.

*Example 6*

A mixture of acrylic resin solutions consisting of 30 parts by wt. of the acrylic resin solution defined in Example 5 and 18.75 parts by wt. of a 40% soft polyacrylic acid ethyl ester dissolved in toluene was dissolved in 47.5 parts by wt. of ethylacetate and was mixed with 0.6 part by wt. of dimethylpolysiloxane oil, 30,000 cst. with OH end blocks and 0.15 part by wt. of the 50% methylpolysiloxane resin solution (C) both dissolved in 3 parts by wt. of toluene. 0.03 part by wt. of a mixture of ethylorthosilicate and dibutyltin dilaurate 3:1 were added as catalyst. The treatment and the results are like those above.

*Example 7*

To solutions analogous to previous examples, consisting of 4.8 parts by wt. of a water insoluble, organic, high polymeric film former such as nitro- or acetyl cellulose or polyvinyl or acrylic resins in 89 parts by wt. of a suitable solvent such as acetone, ethylacetate, benzine, toluene, and the like, were added 1 part by wt. of a dimethylpolysiloxane oil hardenable to silicone rubber and 0.02 part by wt. of a mixture of 3 parts ethylorthosilicate and 1 part dibutyltin dilaurate. These solutions were applied to base members including pergamyn, parchment and other papers or synthetic foils either by dipping, by airbrush or by spraying. After evaporating the solvent, the treated carrier materials were subjected to heat treatment and the base members developed excellent release characteristics while retaining the heat sealing characteristics desired.

Example 8

To brushing solutions of high viscosity cellulose-acetic acid esters or alkylethers or polyvinyl or polyacrylic resins in suitable solvents were added 30 parts by wt. dimethylpolysiloxane oil and 1.5 parts by wt. (calculated on the siloxane) of the 3/1 mixture of ethylorthosilicate and dibutyltin dilaurate for 100 parts by wt. solids content of this solution. Such solutions were applied to any desired carrier material with brushing or lacquering machines. After the solvents were evaporated, they were subjected to brief heat impulse.

Example 9

To 100 parts by wt. of a 30% solution of high viscosity linseed oil varnish and a known hardening agent (siccative) in a suitable solvent such as ethyl acetate, dibutylether, toluene, etc., were added 10 parts by wt. dimethylpolysiloxane oil and, calculated on these, 0.3 part by wt. of the 3/1 mixture of ethylorthosilicate and dibutyltin dilaurate. After treating carrier materials with this mixture, heat treatment is expedient.

Example 10

40 parts by wt. of an aqueous emulsion containing a copolymerizate of vinylacetate and maleic acid dibutylester, having a 50% resin content and a viscosity of ca. 1800 cps. were mixed with 5 parts by wt. of an emulsion consisting of 0.8 part by wt. of a dimethylpolysiloxane oil, 30,000 cst. with OH end blocks, 0.4 part by wt. of (C) the 50% methylpolysiloxane resin solution in toluene, 0.1 part by wt. of (D) tri-isobutyl-phenyl polyglycolether of the formula [(CH$_3$)$_3$C]$_3$C$_6$H$_2$O(CH$_2$CH$_2$O)$_{13}$H, 0.5 part by wt. of a 10% aqueous dibutyltin dilaurate emulsion and 58.2 parts by wt. water. The mixture was applied to paper, cardboard and the like in suitable manner. The treated papers were then dried and briefly exposed to a heat impulse. The papers were adhesive-repellent, heat sealable and could be glued.

Example 11

A mixture of 80 parts by wt. of a 50% solids content aqueous emulsion of a copolymerizate of 50 parts by wt. of vinylacetate and 25 parts by wt. of vinyllaurate and an emulsion containing 1.6 parts by wt. dimethylpolysiloxane oil, 30,000 cst., 0.8 part by wt. of (C) the 50% methylpolysiloxane resin solution, 0.1 part by wt. of (D) polyglycolether, 16.6 parts by wt. water and 1 part by wt. of a 10% emulsion of dibutyltin dilaurate were coated on base members as in Example 10 and with similar results.

Example 12

75 parts by wt. of a 40% aqueous acrylic resin dispersion free of softeners and solvents were mixed with 10 parts by wt. of an emulsion consisting of 1.2 parts by wt. dimethylpolysiloxane oil, 30,000 cs. (OH groups at end of chain), 0.6 part by wt. of (C) the 50% methylpolysiloxane resin solution, 0.1 part by wt. of (D) polyglycolether and 8.2 parts by wt. water. This mixture was catalyzed with 0.7 part by wt. of a 10% emulsion of dibutyltin dilaurate filling up the whole with water until it equals 100 parts by wt. Processing was carried out as above. After treating with suitable solvents, the papers could be glued.

Example 13

The step-wise coating is composed of:
(1) *Primer.*—50% finely dispersed, thin fluid, aqueous dispersion of a copolymerizate of vinylidene chloride, vinyl chloride and acrylic acid butylester.
(2) *Coating.*—This follows drying of the primer and consists of an emulsion of:

0.8 part by wt. of dimethylpolysiloxane oil, 30,000 cst. (OH groups at the end)
0.4 part by wt. of (C) the methylpolysiloxane resin solution
0.1 part by wt. (D) polyglycol ether
0.05 part by wt. dibutyltin dilaurate
98.65 parts by wt. of water Papers thus treated were adhesive repellent, aroma-tight, sealable and, after applying a suitable solvent, they could be glued.

Example 14

Excellent paper adhesives are made from the following composition:

25 parts by weight of a copolymerizate of 85 parts by weight of vinylchloride and 15 parts by weight of vinylacetate and dissolved in 50 parts by weight of ethylacetate, 10 parts by weight methylethyl ketone and 12.5 parts by weight toluene and reacted with 1.4 parts by weight of a dimethyl polysiloxane oil with a viscosity of about 1,000 cs. and having OH-groups on the chain end, 0.2 part by weight methylhydrogenpolysiloxane, 0.8 part by weight of (C) the 50% methylpolysiloxane resin solution and 0.1 part by weight of a hardening agent consisting of 1 part by weight of a crude silicic acid ester of monoethylglycol ether of the formula Si(OCH$_2$CH$_2$OC$_2$H$_5$)$_4$ and 1 part by weight of dibutyltin dilaurate. A short heat treatment is useful.

Example 15

92 parts by weight of a plastisol on the basis of polyvinyl chloride are mixed with 8 parts by weight of a mixture consisting of 6 parts by weight of a dimethyl polysiloxane with a viscosity of 30,000 cs. and having OH groups on the chain end and 2 parts by weight of a liquid methylpolysiloxane resin and to that mixture are added then 0.4 part by weight of a hardening agent consisting of 3 parts by weight of ethylorthosilicate and 1 part by weight of dibutyltin dilaurate. After that the mixture was applied in a known manner by pouring it on a suitable base member to form a foil and subsequently heating it whereby the foil became repellent against all substances inclining to adhesion. Despite the "abhesive" effect of the foil it may be heat sealed to form bags and the like.

This example illustrates that the mixtures according to the invention are not only suitable for the production of coatings but also for the producing of self-carrying foils, films and other plane surfaces.

That which is claimed is:
1. A method for preparing non-adhesive, heat-sealable films and coatings characterized in that a plane-surfaced base member is coated with at least one essentially water-insoluble, organic, high-polymeric, thermoplastic heat-sealable film former selected from the group consisting of cellulose esters, polyvinyl resins, polyacrylic resins, polyacrylic acid esters, polymethylacrylic acid esters and copolymerizates of the foregoing, and a non-adhesive, film forming organosiloxane polymer consisting of a mixture of an elastomer-forming, essentially diorgano-substituted siloxane polymer and a resinous organosiloxane polymer having an organic substituent/silicon ratio of from 0.8/1 to 1.9/1, and thereafter the coated base member is subjected to heat to cure the polymers, the cured polymer film then being removed from the base member to form a self-carrying foil.

2. A method for preparing non-adhesive, heat-sealable films and coatings characterized in that a plane-surfaced base member is coated with at least one essentially water-insoluble, organic, high-polymeric, thermoplastic heat-sealable film former selected from the group consisting of cellulose esters, polyvinyl resins, polyacrylic resins, polyacrylic acid esters, polymethylacrylic acid esters and copolymerizates of the foregoing, and a non-adhesive, film forming organosiloxane polymer consisting of a mixture of an elastomer-forming, essentially diorgano-substituted siloxane polymer and a resinous organosiloxane polymer having an organic substituent/silicon ratio of from 0.8/1 to 1.9/1, and thereafter the coated base member is subjected to heat to cure the polymers.

3. The method of claim 2 further characterized in that the base member is paper.

4. The method of claim 2 wherein the organic film former is a polyvinyl resin.

5. The method of claim 2 wherein essentially all of the silicon-bonded organic groups present are methyl.

6. The method of claim 2 where the thermoplastic film-former is employed concurrently with the organosiloxane polymer in an organic solvent solution.

References Cited by the Examiner

UNITED STATES PATENTS

| | | | |
|---|---|---|---|
| 2,588,367 | 3/1952 | Dennett | 117—155 X |
| 2,768,906 | 10/1956 | James | 117—161 X |
| 2,869,722 | 1/1959 | Marander et al. | 117—161 X |
| 3,061,567 | 10/1962 | Keil | 117—155 X |

WILLIAM D. MARTIN, *Primary Examiner.*

RICHARD D. NEVIUS, *Examiner.*